Aug. 6, 1968           D. L. NEILL           3,395,606
METHOD FOR MEASURING THE DISTANCE BETWEEN TWO REFLECTORS
FORMING A LASER CAVITY BY METERING BEST FREQUENCIES
Filed Jan. 17, 1964           4 Sheets-Sheet 1
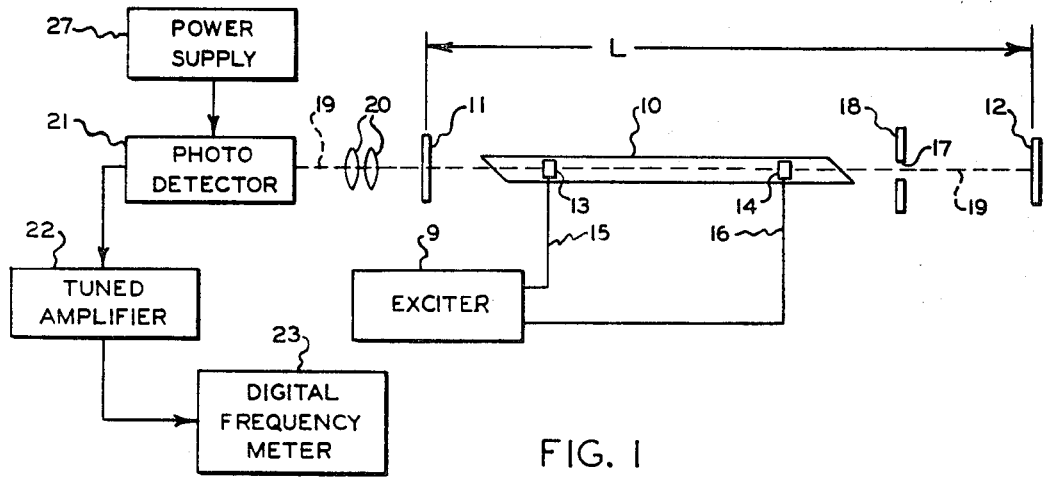
FIG. 1
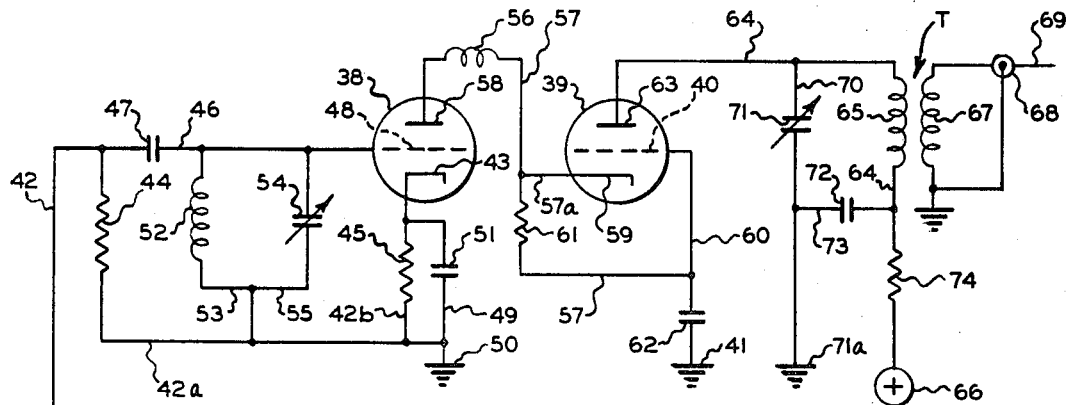
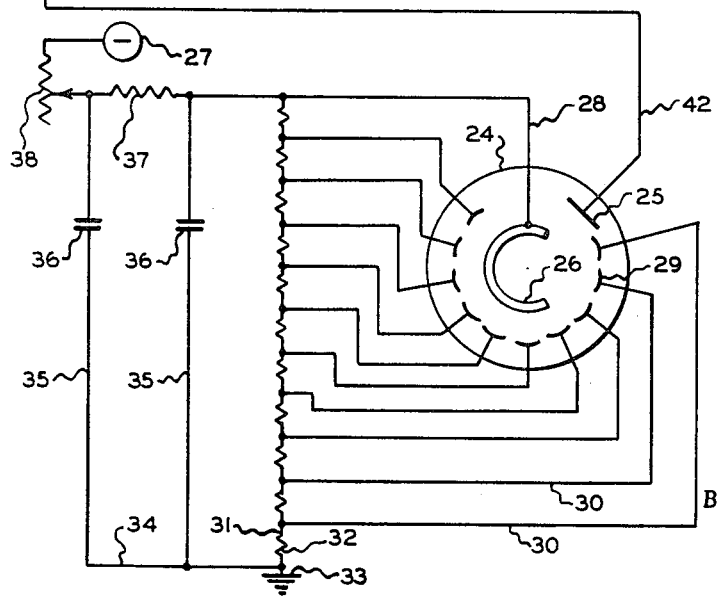
FIG. 2
INVENTOR.
DANIEL L. NEILL
BY
Learman, Learman & McCulloch
ATTORNEYS INVENTOR.
DANIEL L. NEILL
BY
Learman, Learman & McCulloch
ATTORNEYS

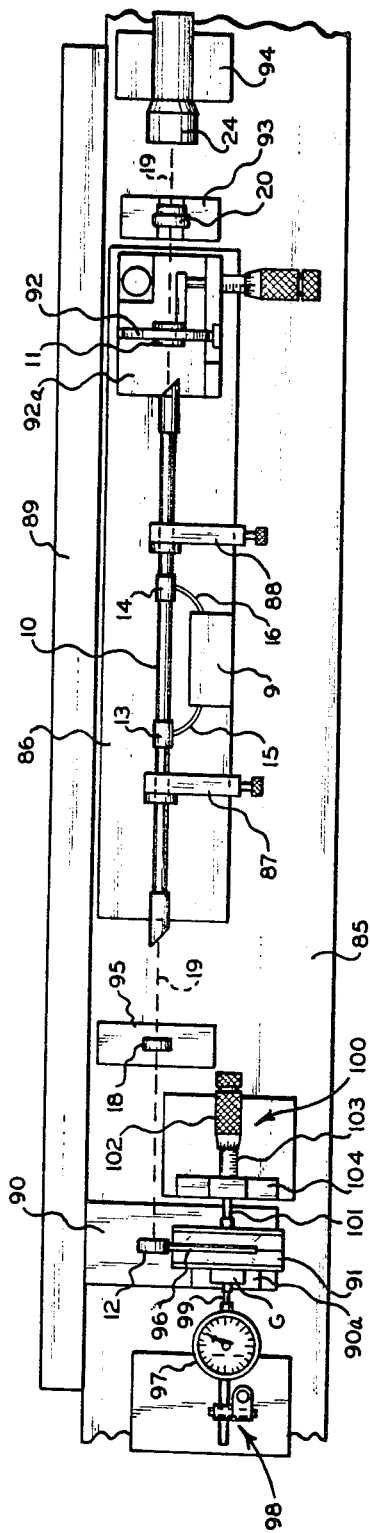

Aug. 6, 1968  D. L. NEILL  3,395,606
METHOD FOR MEASURING THE DISTANCE BETWEEN TWO REFLECTORS
FORMING A LASER CAVITY BY METERING BEST FREQUENCIES
Filed Jan. 17, 1964  4 Sheets-Sheet 4

INVENTOR.
DANIEL L. NEILL
BY
Learman, Learman & McCulloch
ATTORNEYS

United States Patent Office 3,395,606
Patented Aug. 6, 1968

3,395,606
METHOD FOR MEASURING THE DISTANCE BETWEEN TWO REFLECTORS FORMING A LASER CAVITY BY METERING BEST FREQUENCIES
Daniel L. Neill, Saginaw, Mich., assignor, by mesne assignments, to Cooper Industries, Inc., Houston, Tex., a corporation of Ohio
Filed Jan. 17, 1964, Ser. No. 338,407
1 Claim. (Cl. 88—14)

ABSTRACT OF THE DISCLOSURE

A method and apparatus for precisely measuring linear distance wherein first and second reflecting means axially bound a stimulated electromagnetic radiation source unit to define an optically resonant cavity of unknown length constituting a linear distance to be measured of greater length than the source unit in which a radiative laser beam is generated which partially passes through one of the reflecting means to play upon photodetecting means and wherein the difference frequency between adjacent frequencies at which optical resonances occur is expressed as an electrical signal and evaluated as a function of the distance to be measured.

---

The present invention relates to precision measuring systems and more particularly to systems incorporating optical masers or like electromagnetic, radiative energy emission devices.

One of the prime objects of the invention is to provide a system of the character described which enables the measurement of a wide range of distances with extreme accuracy in the ten millionths of an inch or less range.

Another object of the invention is to provide a measurement system which permits the more rapid determination of unknown distances with the same or greater accuracy than is presently possible using interferometric techniques, the system eliminating the necessity of observing and/or counting interference fringes and of employing any type of traversing means over the unknown distance being measured while at the same time providing a measuring resolution several orders of magnitude more precise than known interferometric technique.

Briefly, the invention in one form is concerned with making absolute measurements of distance by detecting the difference frequency produced by the beating of at least two adjacent radiative energy frequencies which coexist in the optically resonant cavity of a stimulated emission source such as a continuous wave gaseous laser and expressing it as an electrical signal having a frequency related to the length of the cavity, translating the frequency of the signal into a digital value, and calculating the length of the cavity according to the formula $$L = \frac{C}{2F}$$

where L is the length of the resonant cavity and the distance being measured, F is the digital signal frequency value, and C is the speed of light in the cavity.

It has been determined that in an optically resonant cavity formed by placing a pair of reflecting surfaces opposite the ends of such a laser, several cavity resonances will occur at slightly different optical frequencies. Adjacent optical frequencies will be separated in frequency by a difference frequency equal to the speed of light within the optically resonant cavity, divided by twice the optical length of the cavity, in accordance with the formula previously set forth. An explanation of the underlying fundamental phenomena whereby several optical frequencies are produced in such an optically resonant cavity is to be found in the book "Lasers, Generation of Light by Stimulated Emission" by Bela Lengyel, published in 1962 by John Wylie & Sons, Inc., New York, N.Y.

In the measurement system which has been invented, one of the mirrors or reflecting means is movable relative to the other and it is the distance or length L between the mirrors which is unknown and must be determined. The two other parameters, the speed of light over a defined path, and the difference frequency F are measurable and definable with an extremely high degree of precision, and accordingly the length L may be calculated with the same degree of precision. The difference frequency may be obtained by beating two adjacent stimulated emission frequencies which are excited simultaneously upon the cathode of a multiplier phototube and feeding the electrical signal produced, which contains the difference frequency between the two stimulated emission frequencies, to a digital frequency metering device to obtain a digital frequency value. The speed of light may be taken to be $299.695 \times 10^6$ (a value obtained by correcting the speed of light in vacuo for standard laboratory conditions) meters per second or, if optimum accuracy is desired and it is desired to correct for the fact that the cavity consists of both atmosphere and the stimulated emission source material—in other words, is not homogeneous—the speed of light in the resonant cavity may be computed according to the same formula by precisely placing the reflecting elements a designated distance apart which is accurately known before measuring and preliminarily calculating the speed of light, using the formula mentioned in a manner which will become apparent.

A number of embodiments of the invention are possible. It is, for instance, possible to determine an unknown length which is actually the difference between two lengths which are each computed by the above described formula, and apparatus for accomplishing this purpose is illustrated in the accompanying drawings. When this method of measurement is employed, the value $299.695 \times 10^6$ meters per second for the speed of light can well be used as the speed of light in the resonant cavity, because any error introduced is of the same order of magnitude in each length calculation over short differential measurement distances.

Another object of the invention is to provide apparatus which can be used for self-calibration purposes, as well as for measurement, in the sense that it can be used to determine a corrected value for the speed of light in the optically resonant cavity over measurement ranges of interest. If the reflecting means are, for instance, precisely spaced apart a known length which is accurate to one part in 10 million, and the corresponding difference frequency as expressed by the signal frequency is determined accurately to one part in 100 million, the formula may be used to determine the speed of light within the optically resonant cavity to an accuracy approaching one part in 10 million.

A further object of the invention is to provide a system of the character described incorporating practical means for selecting the adjacent stimulated emission frequencies which are to be beaten, detecting and expressing the difference frequency, and finally metering the signal which is an expression of the difference frequency and is related to the length of the optically resonant cavity.

Still another object of the invention is to provide a system of this type in which a discrete frequency is developed which is a function of an analog quantity, distance, so that an analog to digital transducer is evolved enabling the analog quantity distance to be determined as a digital quantity, frequency, which may be measured with extreme accuracy.

Other objects and advantages of the invention will be pointed out specifically or will become apparent from the following description when it is considered in conjunction with the appended claim and the accompanying drawings, in which:

FIGURE 1 is a schematic block diagram illustrating the components of a typical measuring system in accordance with the invention;

FIGURE 2 is a wiring diagram diagrammatically illustrating a detecting, selecting, and amplifying system which may be employed in the system;

FIGURE 4 is a front elevational view of certain elements of the system illustrating another manner in which a length measurement can be made;

FIGURE 5 is a top plan view thereof;

Figure 3:
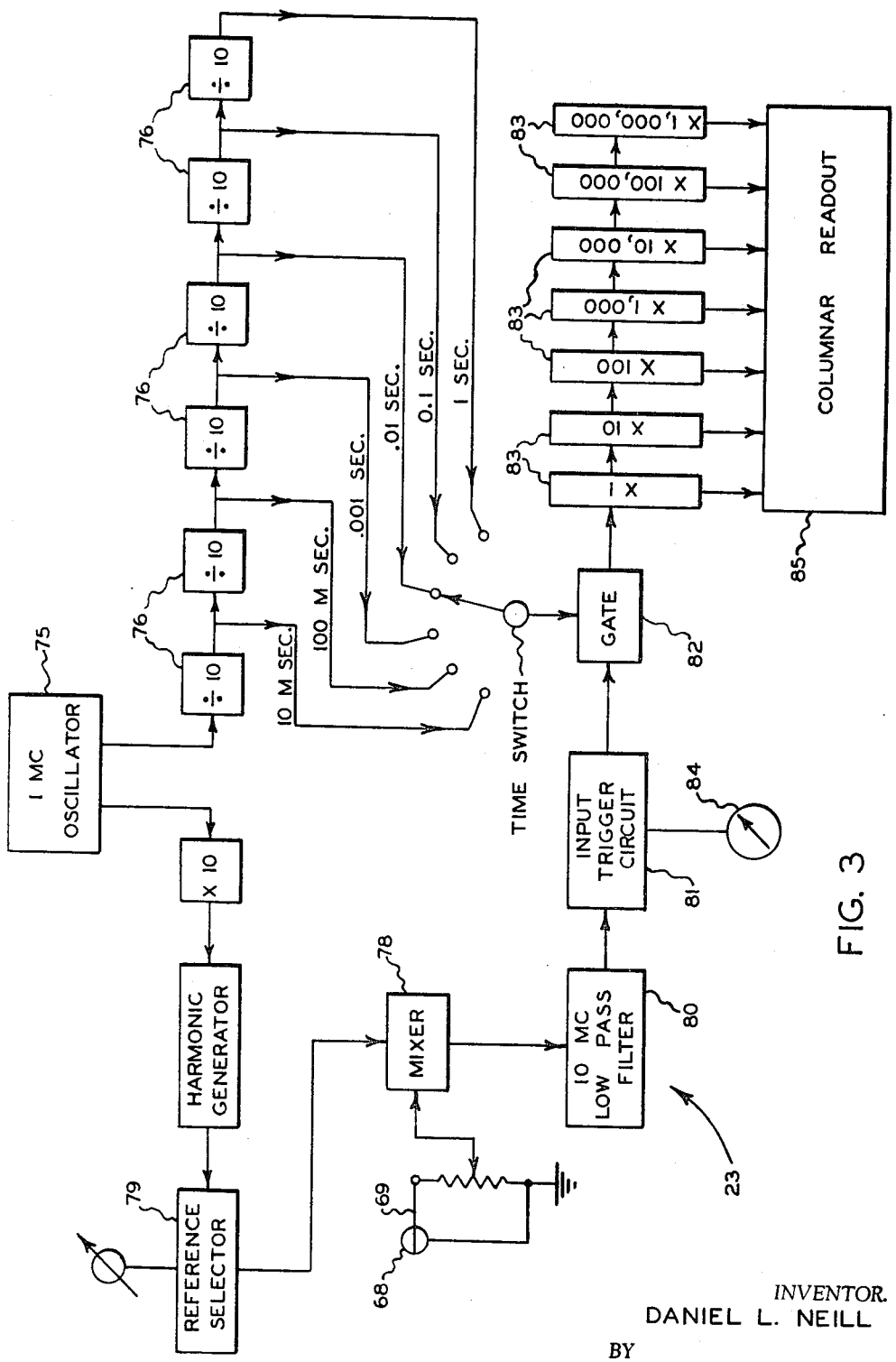
FIGURE 3 is a block diagram illustrating a digital frequency meter which may be employed in the system.

Referring now more particularly to the accompanying drawings and, in the first instance, to FIGURES 1-3 thereof, a radio frequency transmitter exciter 9 is shown connected to an optical maser 10 which may be a continuous wave, gas type laser. Such a laser is described in the book to which reference was previously made and may comprise a closed quartz tube containing helium and neon gases which is placed between two reflecting surfaces 11 and 12 which are aligned so that their reflecting planes are essentially perpendicular to the longitudinal axis of the stimulated emission source 10. In the diagram, FIGURE 1, the reflector 11 is a fixed reference reflector, the reflector 12 is an axially movable reflector, and the variable length resonant cavity of the laser device is the distance L between the two reflectors 11 and 12. The mirrors 11 and 12 may be planar mirrors or preferably may be spherical mirrors with a high degree of reflectivity at the desired frequencies and may, in fact, act as filters for removing unwanted frequencies by making them highly reflective only at the desired frequencies. This may be accomplished in the known manner by using conventional multi-layer dielectric coatings such as those which may be obtained from the Perkin-Elmer Corp., Norwalk, Conn. Optical cavity losses may in this manner be enhanced at all frequencies except those desired. The reflectors must be relatively exactly aligned relative to the axis of the tube 10 to insure that the far greater portion of the reflected waves pass through the tube 10. Spherical mirrors are not as sensitive to alignment variations.

Also, prisms such as cube corners, which, as is known in the art, are four-sided prisms having three sides mutually perpendicular and intersecting at an angle of 45° with the fourth side, may be used as the reflector means, and such prisms in particular have the property of reflecting any incident energy (which strikes the fourth side) directly back to the energy source over wide degrees of both vertical and horizontal alignment. Another reflecting device which may be used and tends to eliminate alignment problems by reflecting all incident energy back to its source is the conventional cat's-eye.

For the sake of convenience, the reflecting means 11 and 12 shown will be assumed to be commercially available spherical mirrors having especially prepared, opposing surfaces providing a high degree of reflectivity at the desired stimulated emission frequencies. The laser 10 which is shown includes electrodes 13 and 14 connected by RF coupler lines 15 and 16 to the source of radio-frequency power 9 which is capable of exciting the helium-neon gas mixture to create a stimulated emission of electromagnetic wave energy in the visible red and the near infrared portion of the electromagnetic wave spectrum, when the reflectors 11 and 12 are properly aligned. The transmitter 9 may be the Challenger model 240-182-2 manufactured by E. F. Johnson Company of Waseca, Minn. The closed ends of the sealed quartz tube 10 are optically flat and slanted at an angle known as the Brewster angle to prevent reflection losses of wave energy traveling along the axis of the tube. While the so-called gas type laser is illustrated, it is to be understood that other devices providing a radiative energy stimulated emission could be provided between the reflectors 11 and 12.

In order for the device to be operative, the cavity located between the two reflectors 11 and 12 must be resonant, i.e., it must permit the reinforcement of the energy which is being reflected back and forth or, in other words, provide a positive feed-back. Thus, the optical length of the resonant cavity must be an integral number of half-wave lengths long which possibly tends to limit the incremental length of the cavity but in no way limits the overall or total length. The optical length of the resonant cavity is many wave lengths long at the stimulated emission frequencies. If the length L of the optically resonant cavity is considered invariant, then two or more different frequencies of stimulated emission, each represented by a different wave length, may exist simultaneously within the cavity provided, the product of the number of half-wave lengths of one frequency times the difference between wave lengths of this frequency and a second frequency is equal to one wave length of the second frequency and further provided that both such stimulated emission frequencies occur within the Doppler broadened atomic resonance line width of the stimulated emission source. The second frequency will have one wave length more (or less) within the fixed length of the optical cavity and may be termed the adjacent frequency. If the Doppler broadened atomic resonance line width is sufficiently broad more than two such cavity resonant conditions can exist.

In addition to being resonant, the optical cavity must have an overall gain greater than unity. That is, the optical gain must be equal or exceed the optical losses at the optical frequencies at which operation is desired. In a continuous wave optical maser of the type described, this gain is provided by a continuously excited gas filled tube or crystal having its optical axis in line with the two reflectors 11 and 12 such that the major portion of the wave energy passing back and forth between the reflectors passes axially through the gas filled tube or crystal and is strengthened by stimulated emission therein. This strengthening effect then overcomes energy transmission and reflection losses to maintain an overall gain equal to or greater than unity at the desired optical frequencies. Thus, the distance between the reflecting means 11 and 12 is limited by the optical cavity losses which are opposed by the optical maser gains and the greater the gains which can be made, the greater the measuring range of the system. To further aid in maintaining cavity gain at a sufficient level to produce oscillations, the reflectors 11 and 12 must be coated to provide a high degree of reflectivity at the desired optical frequencies, as noted.

Provided between the one end of the laser 10 and the movable reflecting means 12 is a preferably adjustable aperture 17 provided in a diaphragm member 18. Such diaphragms are well known in the optical art and a suitable diaphragm is that having an adjustable opening in the range 3/16 inch to 1/32 inch in diameter, manufactured by Eastman Kodak Company of Rochester, N.Y. The aperture 17 is employed to control the size and geometry of the stimulated emission beam 19 originating within the resonant optical cavity. It is used ideally to prevent the existence of wave energy having undesirable modes of oscillation to restrict the beam to a single axial mode of oscillation and to restrict the existence of all cavity resonant frequencies in the single mode of oscillation save for two adjacent cavity resonant frequencies. Adjusting the cavity aperture in this manner has the effect of reducing the efficiency of the cavity resonances such that, once a single axial mode is established, it is possible to limit the stimulated emission to two dominant adjacent frequencies created by two adjacent dominant cavity resonances within the Doppler broadened atomic line width. Both reflection and diffraction losses affect the efficiency of a resonant cavity. For a Fresnel number approaching unity (or one), diffraction losses tend to predominate within the cavity. As the Fresnel number is directly proportional to the square of the mirror or reflector radius and inversely proportional to the axial length of the cavity, the cavity diffraction losses may be increased by decreasing the former cavity parameter. Diaphragm 18 does exactly this and thereby increases the diffraction losses to a point such that only two cavity resonances have sufficient gains to produce stimulated emission. I have determined that these two cavity resonances are always adjacent in frequency and near the center of the Doppler broadened atomic line width. At the opposite end of the laser tube 10 a proportion of the beam 19 passes through the fixed reference reflector means 11, which, as usual, has a peak reflectivity of only about 99 percent at the operating frequencies, a pair of image adjusting plano convex, diffusing lenses 20 to play on a photo detector unit generally designated 21 which may take the form of a photomultiplier tube.

The aperture 17 is reduced in diameter until only a single spot (indicating the existence of a single axial mode) appears on the light sensitive surface of the photo detector unit 21 and this beam will include two adjacent optical or radiant frequencies which beat upon the cathode and create an electrical signal having a much lower frequency related to the length of the cavity. The signal is passed to the tuned amplifier 22, which tunes out all but the desired signal frequency and passes it to the direct reading digital frequency meter 23 which furnishes a frequency value, it being understood that the length L can be readily computed according to the formula mentioned. Instead of the meter 23a, a conventional frequency synthesizer could be used in conjunction with a mixer to produce a zero beat when the known synthesized frequency equals the unknown frequency it is desired to measure.

In FIGURE 2 I have schematically illustrated a preferred form of detecting, selecting and tuned amplifying system identified in FIGURE 1 by numerals 21 and 22. The photo detector unit 21 includes a photomultiplier tube 24, having an anode 25 and a cathode 26, which may be a conventional RCA tube model 7102 and the tuned amplifier 22 may be a conventional tuned radio frequency amplifier. The cathode 26 is connected to a direct current source of power 27 by a line 28 and dynodes 29 are also connected to the power source by lines 30 which connect with a line 31 having resistances 32 therein, the line 31 being grounded as at 33. Bridging wires 35 joining line 28 and a line 34 connecting with line 31 are provided with capacitors 36 in the usual manner to provide filtering, and resistance 37 and variable resistance 38 are provided in line 28.

The flow of electrons from the anode 25 contains a signal having a frequency which, as previously observed, is the difference or beat frequency which is related to cavity length and this signal is passed to the tuned amplifier generally designated 22 which is used to exclude all other frequencies as well as to amplify the beat frequency. A typical tuned amplifier circuit is shown in FIGURE 2 and comprises triode tubes 38 and 39 connected in series, with the control grid 40 of tube 39 grounded as at 41. The anode 25 is connected by a line 42 to the junction of grid line 46 and a line 42a in which are respectively a capacitor 47 and a resistor 44 which acts as a load. The line 46 connects to the grid 48 of tube 38. A line 49 connected to the cathode 43 of tube 38 is grounded as at 50 and includes capacitor 51 which provides cathode bypass. Connected across the lines 42a and 46 is a parallel resonant circuit, including choke coil 52 in line 53 and variable capacitor 54 in the line 55, to tune the signal to the tube 38 to the desired frequency. A choke coil 56 in the output line 57 which leads from the plate 58 of tube 38 effectively tunes the grid to plate capacitance of the input triode 38 to zero over the desired frequency range.

It will be seen that a line 57a connects line 57 with the cathode 59 of triode 39 and that the line 57 connects with the grid line 60. A resistance 61 provides grid leak for the grid 40 of tube 39, and the capacitor 62 in line 60 effectively grounds the grid 40 at high frequencies. Connected to the plate 63 of triode 39 is a line 64 which includes the primary coil 65 of an air core transformer generally designated T which is connected to a direct current power source 66. The transformer secondary coil 67 is connected with a jack 68 from which a line 69 leads to the digital frequency meter. The primary 65 and a line 70 which is grounded as at 71a and includes a variable capacitor 71 provides a tuning circuit. A capacitor 72 which provides DC isolation for the tuned circuit is provided in a line 73 bridging lines 70 with line 64. The resistance 74 is included in line 64.

In the operation of the tuned radio frequency amplifier, generally designated 22, the voltage input developed across the resistor 44 passes via the capacitor 47 to the grid 48 of the tube 38 where it affects the plate current flowing through both tubes 38 and 39. This results in a much larger voltage appearing across the tuned parallel resonant load consisting of capacitor 71 and the primary coil 65 of transformer T. This amplifier output voltage is inductively coupled to the secondary coil 67 of transformer T and to input jack of digital frequency meter 23. The variable capacitors 54 and 71 are used to tune the stages to a band width which will pass the desired frequency but exclude all others. A particular amplifier which has been employed has a band width of approximately 1 megacycle and a gain of approximately 200 at 100 megacycles, but it is to be understood that any other suitable electronic circuit having similar overall characteristics, such as a superheterodyne system, could be used.

The digital frequency meter which is illustrated by block diagram in FIGURE 3 may be the conventional Beckman model 7175, manufactured by Beckman Instruments, Inc., of Richmond, Calif. The Beckman meter is controlled by a master one-megacycle oscillator 75 which provides a precision measuring period having the same degree of precision as oscillator 75. Oscillator 75 is used to provide a precision measuring period (in an accuracy range that can be made as precise as 1 part in 10 per day) which may be selected from one microsecond in steps of ten times to one second. This period is provided by a series of divide-by-ten dividers 76, cascaded as indicated. Patents Nos. 2,900,601, and 2,843,320 disclose frequency measuring devices of similar character.

As the frequencies measured are above 10 megacycles per second, the frequency meter also uses oscillator 75 to produce higher frequencies in multiples of 10 megacycles per second which can be used in a conventional mixer 78 to beat the unknown incoming frequency to a value below 10 megacycles per second. A reference selector 79 selects a precisely generated frequency in multiples of 10 megacycles per second which is less than but within 10 megacycles per second of the incoming signal. The reference frequency beats in the mixer 78 with the incoming signal to produce a difference frequency less than 10 megacycles per second which passes through the low pass filter 80 to the input trigger circuit 81 and through precisely controlled gate 82 into the decimal counting units 83. Heterodyne meter 84 determines the proper setting of selector 79 by indicating the maximum signal passage through filter 80 when selector 79 is in the proper position. If a one second period is used, the decimal readout at 85 will be directly in cycles per second, with an accuracy of plus or minus one count on the least significant digit, or plus or minus one part in 99 million or more.

In operation, the gases within tube 10 are excited by the radio-frequency energy source 9 and the stimulated emission beam 19 is produced by properly aligning the tube 10 with the mirrors 11 and 12 in the usual manner. The stimulated emission beam 19 is shaped to produce the most desirable pattern for detection by the photo detector unit 21 by adjusting diaphragm 18 to properly restrict the radiative energy permitted to pass through the fixed reflector 11 and lenses 20 and play upon the cathode 38 of the photomultiplier tube 21. Diaphragm 18 is placed within the optically resonant cavity to obtain as much power in the beam 19 as possible and accomplishes the result of restricting the radiative energy received by the cathode 26 to a single longitudinal or axial mode. The beating of at least two adjacent frequencies on cathode 26 produces an electron flow in the anode 25 which is proportional to the difference frequency between the two frequencies which have been mentioned. This difference frequency, as has been noted, is a much lower frequency than that of the frequencies of the stimulated emission beam and is related to the length of the optical cavity according to the formula mentioned. Because the difference frequency only depends on the physical length of the optically resonant cavity, and the speed of light in the cavity, and is not related to the theoretical or the actual frequency value of the stimulated emission, it is therefore not compromised by any "pulling" effect created by the interaction between the atomic and cavity resonances as is the stimulated emission frequency. Proper adjustment of diaphragm 18 reduces the efficiency of the cavity resonances and thereby tends to eliminate the nonlinear saturation or "hole burning" effects on the adjacent stimulated emission frequencies. The output of the anode 25 passes through tuned amplifier 22 which employs variable capacitors 54 and 71 to tune the stages represented by triodes 38 and 39 to a band width which will allow the desired frequency to pass but exclude all others. The output of the amplifier proceeds to the digital frequency meter which produces a reading in terms of the difference frequency and this reading can then be used in the formula to calculate the length L.

*Example*

In a typical measurement, it was desired to determine the length L. The radius of curvature of the spherical mirrors 11 and 12 in this instance was 50 meters. Adjacent frequencies of the order of $4.74 \times 10^{14}$ cycles per second and $4.74 \times 10^{14}$ plus 100 megacycles per second (wave length .6328 micron) were the frequencies beat upon the cathode 26 and the beat frequency produced by unit 21 was between 99 and 101 megacycles per second at the tuned amplifier. The incoming frequency was determined with meter 23 as 90 megacycles per second plus a seven digit counter reading of 9.898333 megacycles. When this value, 99.898333, is substituted in the aforementioned formula, a distance L of 1.500 meters results.

The reading on meter 23 which is used is the highest repeated frequency reading rather than the most often repeated frequency reading since with dust in the air the integrity of the cavity cannot be maintained throughout the counting period. Readings were obtained with the counting interval .01 and .1 of a second and under ideal conditions in the absence of any dust in the cavity atmosphere it is believed that an average reading would be obtained during one second periods which would be accurate.

In FIGURES 4 and 5 I have demonstrated a system which I have used to calculate the length of a gauge block G. In this system the various elements may be set up in the manner shown, on a flat surface 85. The laser tube 10 is shown as mounted on a base 86 by means of adjustable mounts 87 and 88 which permit vertical and horizontal adjustment. A straightedge or the like 89 is provided in parallelism with the tube 10 to align axially movable reflecting means comprising a movable base 90 on which a magnetic V-block 91, with which the block G is engaged, carries mirror 12. The opposite mirror 11 is mounted for tilt and azimuth adjustment in a mirror mount 92 on a block 92a and it is to be understood that this adjustment may be accomplished in any known manner. Mirror 12 and opposite mirror 11 both have a one meter spherical radius, and are 1 inch in diameter and ⅜ inch thick. They are both vacuum coated for 98.9% reflection at 0.6328 micron wave length and 0.3% transmission at the same wave length. The coatings are built up of 13 layers of so-called dielectric substances so as to have high transmittance at other optical wave lengths.

The diffusing lenses 20 are mounted on a base 93 and the photomultiplier tube 24 is mounted by a base 94. The adjustable diaphragm 18 is mounted on a suitable base 95, and the mirror 12 has a rod 96 which is magnetically held within the V of the block 91. A conventional dial indicator 97 mounted on a stand 98 has its reciprocable plunger 99 in engagement with the gauge block G which is supported on the support block 90a provided on the base 90. A micrometer device generally designated 100, including a spindle 101 engaging the V-block and a thimble 102 connected with the spindle 101 to move it relatively to the scale on a barrel portion 103 is provided, the barrel 103 of the micrometer device being supported by a suitable block support 104.

In the operation of this device, the length L to be measured by the measurement system shown is the distance between the reflecting surfaces of the mirrors 11 and 12, as indicated particularly in FIGURE 5. The actual distance to be determined is the length of the gauge block G and this is accomplished in the following manner: Once the beam 19 has been established in the manner previously described, the gauge block G is placed on the block 90a in engagement with the side of V-block 91. The adjusting means 100 is used to move the opposite surface of gauge block G against the dial indicator plunger 99. The indicator 97 may be one with a total range of .2 inch which reads out in .0001 of an inch increments. When this has been done, the reading on the indicator 97 is noted, as is the frequency metered in the aforedescribed manner by the digital frequency meter 23. This value of the frequency is recorded and is used to calculate the distance L between mirrors 11 and 12 according to the formula mentioned.

The gauge block G is now removed, leaving an empty space between indicator plunger 99 and the V block 91. The thimble 102 of the micrometer adjusting means 100 is now rotated to advance the spindle 101 axially and move the V block 91 and base 90 along the straightedge 89 until the V block 91 engages the indicator plunger 99. The forward movement is continued until the indicator 97 reads precisely the same as it did when the gauge block G was in place. Inasmuch as the mirror 12 is carried by the V block 91, it has moved a distance equal to the movement of the V block 91 and the optically resonant cavity L is now longer than previously. Accordingly, a different frequency value will be read at the digital frequency meter and this new value is recorded and used in the formula to calculate the new distance L between mirrors 11 and 12. Thus, it is only necessary to subtract the first determined length L from the second determined length L to obtain the difference between the two calculated distances, which is the width of gauge block G. With optical cavity distances of 54 inches to 78 inches, repeatable accuracies have been obtained in measuring widths in the manner described to within plus or minus .0005 inch or plus or minus 10 parts per million using spherical reflectors of one meter radius. Using reflectors having spherical radii of 50 meters, it is possible to measure distances over the same range to within plus or minus 10 millionths of an inch or plus or minus 0.2 part per million or better.

Figure 6:
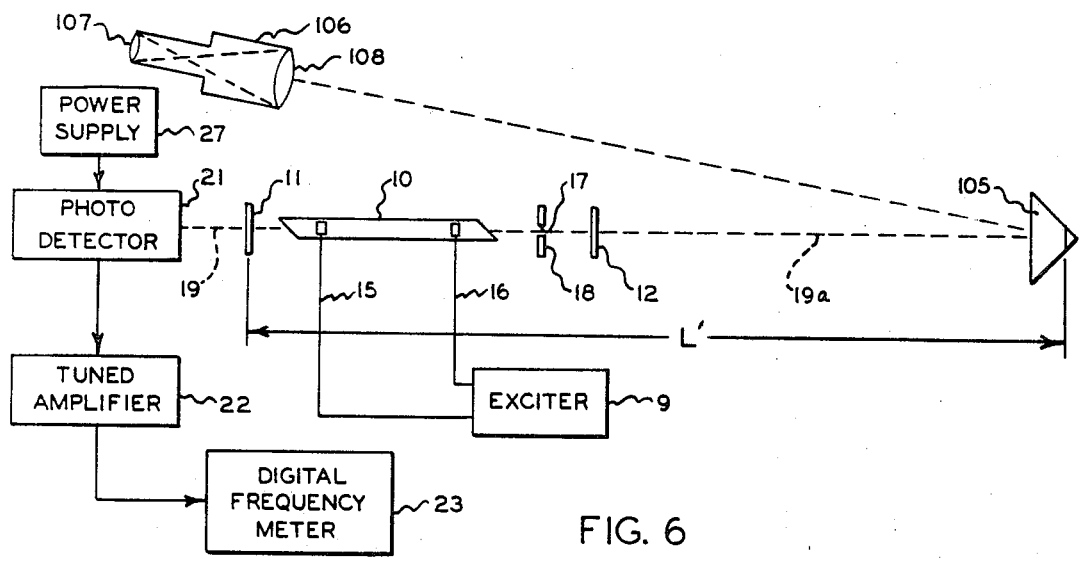
FIGURE 6 is a diagrammatic view of another embodiment of the measuring system illustrating how long distance measurements may be made.

In FIGURE 6 I have demonstrated a modified measuring system which is usable to measure relatively longer distances and, for the sake of convenience, have used the same numerals to identify the similar parts and mechanisms. In this system a reflector 105 is employed beyond the optical cavity between the mirrors 11 and 12, and the reflector 105 is initially optically aligned with the stimulated emission source 10 by using a telescope 106 which is adjustably mounted on the same base structure as the laser tube 10 to allow parallax compensation. For instance, it would only be necessary to provide a telescope mount which is aligned axially with the tube 10 in the vertical plane on the base 86 shown in FIGURE 4. The telescope is shown as having the usual lenses 107 and 108.

In the operation of this modification of the system the reflector 105, which may be the cube corner reflector previously mentioned, is placed to coincide in the manner indicated with the length L' to be measured. The aperture 17 in diaphragm 18 has first been adjusted to provide the desired emission beam 19 in the resonant cavity L between reflectors 11 and 12, and some of this radiative energy 19a passes through the mirror 12 and travels to the cube corner reflector 105. To be sure that the reflector 105 is properly aligned, a second operator at reflector 105 then makes a final adjustment of this reflector 105 such that the reflected beam from reflector 105 will be seen by an operator at reflector 12 to fall on the rear face of reflector 12 and be essentially superimposed in the form of a spot on the stimulated emission beam 19 at this rear surface of reflector 12. The operator at reflector 12 will then remove the reflector 12, creating a much longer optically resonant cavity, once alignment has occurred, between the reflecting means 11 and the reflecting means 105. Adjacent coherent frequencies are now beat on the detector 21 in the manner described previously and, it has been determined, yield a beat frequency now related to the length of this enlarged, optically resonant cavity. As the approximate distance L' is known, the operator tunes amplifier 22 to the approximate frequency and reads the actual frequency on digital frequency meter 23. The actual distance L' is then calculated, based on the formula previously mentioned.

Figure 7:
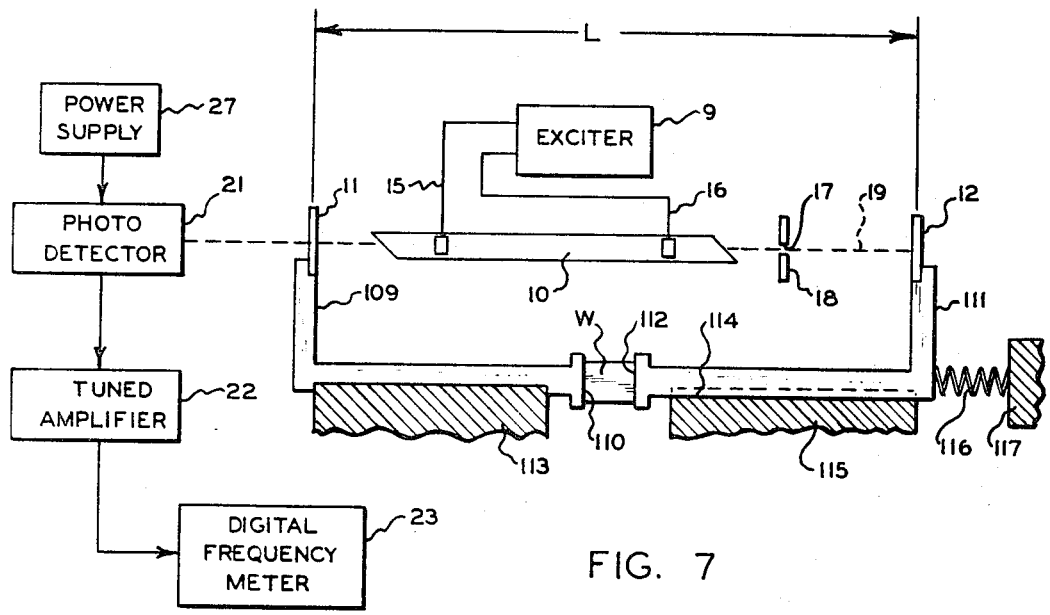
FIGURE 7 is a diagrammatic view of still another embodiment of the measuring system.

In FIGURE 7 a further embodiment of the invention is shown in which again the numerals previously used identify the same parts. In this embodiment of the invention the fixed mirror 11 is mounted on a fixed gauge jaw member 109 having a work engaging reference surface 110 and the movable reflecting means comprises the mirror 12 and the movable jaw member 111 on which it is mounted, the jaw member 111 having a work engaging reference surface 112. Jaw member 109 is, in use, mounted in fixed position on a base 113, whereas jaw member 111 is mounted for linear, axial reciprocating movement in a groove 114 provided in a base 115. A spring 116 mounted on a frame member 117 normally urges the jaw member 111 toward jaw member 109 and into engagement with the workpiece W whose length is being measured.

In practice a workpiece standard of known length is placed between the surfaces 110 and 112 and a frequency reading is obtained on meter 23. Then a workpiece whose length is to be measured is placed between surfaces 110 and 112 and the reading obtained on meter 23 is noted. If the reading differs from the reading obtained with the workpiece standard, the operator is aware that the length of the workpiece is not the same and, dependent on how significantly the reading differs, the operator may determine that the workpiece does not fall within the tolerance limits chosen.

Certain terms are used in the specification and claims which in the interest of clarity should be specifically understood. For example, the term "optical" is used to describe the cavity as an optical cavity or the frequencies or resonances as optical. It is intended that the term "optical" be broad enough to include radiant energy incapable of appreciablly affecting the average normal retina (so-called invisible light) but otherwise like luminous energy. By "adjacent cavity frequencies or resonances" are meant any two occurring consecutively within the Doppler broadened atomic resonant line width of the stimulated emission source. The diaphragm 18 is used in the manner described to limit the axial modes to a single axial mode with two dominant adjacent frequencies. It has been determined that less precise, but usable (for some purposes) measurements can be obtained when two axial modes exist because the adjacent optical frequencies which are beat upon the photomultiplier cathode are, in fact, so near the same value.

It is to be understood that, while I have demonstrated various measuring systems, other systems may be provided within the scope of the invention. Therefore, it is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claim.

I claim:

1. A method of measuring with extreme accuracy comprising: adjusting the emitted wave energy generated by a stimulated emission source bounded by a first and a partly transmissive second reflecting means defining a first optically resonant cavity to issue a beam with radiative energy of at least two different, adjacent frequencies at which cavity resonances occur; adjusting the position of a third reflecting means disposed outwardly of the second reflecting means so that the portion of the beam passing through the second reflecting means and reflected from the third reflecting means axially aligns with the beam in said first cavity; removing said second reflecting means to form a second optically resonant cavity between the first and third reflecting means; detecting the difference frequency between different frequencies at which cavity resonances occur in the second optical cavity and expressing it as an electrical signal; and metering the electrical obtain a digital difference frequency value which is a function of the length of the second cavity.

References Cited

UNITED STATES PATENTS

| 2,819,453 | 1/1958 | Cohn | 324—58 X |
| 3,134,837 | 5/1964 | Kislink et al. | 331—94.5 |
| 3,170,122 | 2/1965 | Bennett | 331—94.5 |
| 3,187,270 | 6/1965 | Kogelnik et al. | 331—94.5 |

Javan et al.: "Population Inversion and Continuous Optical Maser Oscillation in a Gas Discharge Containing a He-Ne Mixture," Physical Review Letters, vol. 6, No. 3, February 1961, pp. 106–110.

JEWELL H. PEDERSEN, *Primary Examiner.*

O. B. CHEW, *Assistant Examiner.*